United States Patent Office 3,031,264
Patented Apr. 24, 1962

3,031,264
PRODUCTION OF BORIC ACID
Nelson P. Nies, Laguna Beach, Calif., assignor to United States Borax & Chemical Corporation, Los Angeles, Calif., a corporation of Nevada
No Drawing. Filed Feb. 13, 1958, Ser. No. 714,950
1 Claim. (Cl. 23—149)

This invention relates as indicated to methods for producing boric acid and has more particular reference to cyclic production of boric acid from sodium borates and carbon dioxide.

It is well known that borax solutions will absorb carbon dioxide and that sodium bicarbonate can be crystallized from brines containing sodium carbonate and borax by adding carbon dioxide. However, heretofore neither sodium bicarbonate or boric acid has been crystallized from solutions containing only sodium borates and carbon dioxide. I have found that by controlling the temperature and carbon dioxide pressure applied to a sodium borate solution of suitable concentration, sodium bicarbonate and boric acid can be successively crystallized from solution.

It is therefore the principal object of the present invention to provide a new and novel process for the production of boric acid.

A further object of this invention is to provide a cyclic process for crystallizing boric acid from solutions containing only sodium borates and carbon dioxide.

A still further object is to provide means whereby the need to evaporate water to produce crystallization is avoided.

Other objects will become apparent as the description proceeds.

To the accomplishment of the foregoing and related ends, the invention then comprises the features hereinafter fully described and particularly pointed out in the claim, the following description setting forth in detail certain illustrative embodiments of the invention, these being indicative, however, of but a few of the ways in which the principle of the invention may be employed.

Broadly stated, this invention comprises the cyclic method of producing boric acid from sodium borate and carbon dioxide in aqueous solution, which comprises preparing a solution of sodium borate having a $Na_2O:B_2O_3$ mole ratio from about 0.30 to about 0.38 mole of $Na_2O$ per mole of $B_2O_3$, heating the solution at a predetermined first temperature selected from the range of about 25°–75° C., applying $CO_2$ to said solution at a predetermined first pressure, adding sodium borate to the solution, changing the first temperature and first $CO_2$ pressure to a second temperature and a second $CO_2$ pressure, removing a first crystallized product from said solution, changing the temperature and $CO_2$ pressure to about the first predetermined temperature and first $CO_2$ pressure, and removing a second crystallized product, said first product selected from sodium bicarbonate and boric acid, and said second product being the remaining material from said sodium bicarbonate and boric acid, and then recycling the mother liquor from said second crystallization.

From the foregoing broadly stated paragraph, it will be seen that the present process can be carried out by preparing a solution at a predetermined $CO_2$ pressure and temperature, having the predetermined composition of a boric acid mother liquor, and then either (a) adding sodium borate to the solution, increasing the temperature and pressure to crystallize sodium bicarbonate, removing the sodium bicarbonate, lowering the pressure and temperature of the mother liquor to the first temperature and pressure, crystallizing boric acid and recycling the mother liquor; or (b) increasing the temperature and pressure of the solution to crystallize sodium bicarbonate, removing sodium bicarbonate, adding sodium borate to the mother liquor, lowering the carbon dioxide pressure and the temperature of the mother liquor to the original pressure and temperature, crystallizing boric acid, removing the boric acid and recycling the mother liquor.

Thus, the present process is controlled by predetermined temperatures and pressures which, as will be shown, in turn predetermine the amount of $CO_2$, $Na_2O$ and $B_2O_3$ in solution from which the boric acid is crystallized. I have found the temperatures applicable to the present invention to be from about 25° C. to about 75° C. I prefer to operate the present process at pressures of from about 30 p.s.i.a. to about 615 p.s.i.a.; however, it is to be understood that the present process can be operated at pressures above 615 p.s.i.a. Since higher pressures would necessitate the use of more complicated and costly high pressure equipment, I prefer to use pressures of about 30 to 615 p.s.i.a.

By controlling hte $CO_2$ pressure and temperature in a solution having from about 0.30 to about 0.38 mole $Na_2O$ per mole of $B_2O_3$, I am able to control the concentrations at which sodium bicarbonate and the concentrations at which the boric acid crystallize out of solution. By preselecting the proper temperature and pressure I crystallize $NaHCO_3$ to produce a mother liquor having a low $Na_2O:B_2O_3$ mole ratio. Then by cooling the $NaHCO_3$ mother liquor and decreasing the $CO_2$ pressure I am able to crystallize boric acid whereby a solution is produced which has a higher $Na_2O:B_2O_3$ mole ratio. This boric acid mother liquor is then recycled.

From a detailed study of boric acid, sodium borate and sodium bicarbonate in solution, I have been able to develop empirical formulae giving the carbon dioxide pressure and concentration for producing saturated solutions, as a function of the temperature.

In the process of the present invention for carrying out the general reaction $Na_2B_4O_7 \cdot nH_2O + (7-n)H_2O + CO_2$
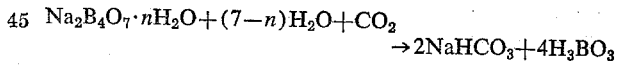
$\rightarrow 2NaHCO_3 + 4H_3BO_3$ (where $n$ is 7 or less for no evaporation), the sodium borate can be added to the sodium bicarbonate mother liquor or to the boric acid mother liquor.

By preselecting the temperature it is possible to precalculate $CO_2$ pressures and concentration of $Na_2O$ and $B_2O_3$. Once the calculations have been made the process can be started from a boric acid mother liquor either by addition of an exact additional amount of sodium borate with subsequent crystallization and removal of sodium bicarbonate, or by crystallization and removal of sodium bicarbonate followed by addition of a calculated amount of sodium borate.

It is to be noted that all the calculations for both mother liquors are predetermined so that regardless of whether the sodium borate is added to the boric acid mother liquor or to the sodium bicarbonate mother liquor, the amount of sodium borate to be added can be determined.

TABLE I

The following formulae are used to determine the $Na_2O$, $B_2O_3$ and $H_2O$ content of a boric acid mother liquor;

$$\log g = 4.934 - \frac{1332}{273 + t_1}$$

$$\log b = 5.012 - \frac{1200}{273 + t_1}$$

$$c = 91.35 - 0.0411 t_1 - 0.00781 t_1^2$$

where:

$g$=weight percent $Na_2O$
$b$=weight percent $B_2O_3$
$c$=weight percent $H_2O$
$t_1$=preselected temperature of boric acid mother liquor.

The foregoing formulae can be used to precalculate the $Na_2O$, $B_2O_3$ and $H_2O$ content of a boric acid mother liquor at any preselected temperature. These formulae can be determined arithmetically, since the boric acid mother liquor being saturated with three solid phases, sodium bicarbonate, boric acid and sodium pentaborate, forms with these solids and the vapor, a system of four components and five phases which is accordingly univariant. Specifying the temperature is therefore sufficient to determine the composition of the liquor. Thus the percentages of $Na_2O$, $B_2O_3$ and $H_2O$ can be precalculated from the above formulae at any desired temperature.

The $Na_2O$, $B_2O_3$ and $H_2O$ content of a sodium bicarbonate mother liquor is also predetermined, however, not arithmetically. The sodium bicarbonate mother liquor being saturated with two solid phases, sodium bicarbonate and boric acid, forms a divariant system and has two independent variables which may be the temperature and $CO_2$ pressure. In this instance the $Na_2O$, $B_2O_3$ and $H_2O$ are predetermined by chemical analysis. The method of determining saturation of a solution at a preselected temperature is well known to those skilled in the art. However, for the sake of clarity the method is given here.

*Procedure for Determining the $Na_2O$, $B_2O_3$ and $H_2O$ Content of a Sodium Bicarbonate Mother Liquor*

In a pressure vessel equipped with an efficient mechanical stirrer and a tube having a filter on the lower end reaching near the bottom of the vessel, place 300 grams sodium bicarbonate, 500 grams boric acid and 660 grams $H_2O$. Close the vessel and connect to an outside source of $CO_2$. Apply the pressure desired and maintain at the desired temperature, with stirring, until equilibrium is reached. Connect the outside end of the tube having the filter to a weighed sampling device consisting of a short pipe nipple with a valve at each end. While maintaining the desired pressure open all valves between the pressure vessel and the sampling device and fill the latter with a representative sample of the liquid by allowing several times its volume of liquid to flow through. Close all valves, weigh the sampling device containing the liquid sample, and then using standard methods of analysis, analyze for $Na_2O$, $B_2O_3$ and $CO_2$. The weight percent of $Na_2O=h$, the weight percent of $B_2O_3=e$, the weight percent of $CO_2=i$, and the weight percent of $$H_2O = f = 100 - (h + e + i)$$

In a cyclic process starting with sodium tetraborate pentahydrate the equation $$Na_2B_4O_7 \cdot 5H_2O + 2CO_2 + 2H_2O \rightarrow 2NaHCO_3 + 4H_3BO_3$$

shows that two moles of water are stoichiometrically required. This water may be added to either mother liquor or may be added by using a mixture of the 5 mole and 10 mole hydrates containing 7 moles of water. In a process in which the sodium borate is added to the boric acid mother liquor, in order to avoid the necessity of evaporating water, $t_2$ has to be chosen so that $$\frac{f - ae}{h}$$

at $t_2$ is equal to $$\frac{c - ab}{g}$$

at $t_1$. If the stoichiometric water required is added equally to both mother liquors at 615 p.s.i.a., $t_2$ is given by the formula $$t_2 = t_1 + \frac{710}{t_1 + 20}$$

and at 215 p.s.i.a., if $t_1 = 26°$ C., $t_2 = 35°$ C. At other temperatures and pressures $t_2$ may be found as follows:

At the pressure desired, determine $h$, $e$, and $f$ at various temperatures as described above and plot the value of the function $$\frac{f - ae}{h}$$

against the temperature. From this plot determine the temperature $t_2$ at which the value of $$\frac{f - ae}{h}$$

is equal to the value of $$\frac{c - ab}{g}$$

as calculated from the values $c$, $g$, and $b$ at temperature $t_1$ by the empirical equations given. The value of the factor "$a$" depends on the place in the process where the stoichiometric water requirement is added; if this water is added in equal parts to the boric acid and sodium bicarbonate mother liquors "$a$" is 0.646; if all this water is added to the boric acid mother liquor it is 0.775; if all this water is added to the sodium bicarbonate mother liquor it is 0.517. In other cases the value of "$a$" is determined by interpolation between these values.

In a cyclic process in which the sodium borate is added to the sodium bicarbonate mother liquor, the necessity of evaporating water is avoided by determining $t_2$ similarly as the temperature at which $$\frac{f + dh}{e}$$

is equal to the value of $$\frac{c + dg}{b}$$

at temperature $t_1$. The value of "$d$" is determined as follows: $d$=zero if the stoichiometric water is added equally to the boric acid mother liquor and sodium bicarbonate mother liquor; $d = +.29$ if this water is all added to the boric acid mother liquor; $d = -.29$ if this water is all added to the sodium bicarbonate mother liquor. In other cases the value "$d$" is determined by interpolation between these values. If the pressure is 615 p.s.i.a. and the water requirement is added equally to the two mother liquors, $$t_2 = t_1 + \frac{350}{t_1}$$

Using the foregoing formulae for calculating the concentration of a boric acid mother liquor and the disclosed method for calculating the concentration of a sodium bicarbonate mother liquor, it is now possible to completely precalculate the conditions for producing boric acid according to the present invention.

Thus the $Na_2O$, $B_2O_3$ and $H_2O$ content for a boric acid mother liquor are predetermined arithmetically and the $Na_2O$, $B_2O_3$, $CO_2$ and $H_2O$ content of a sodium bicarbonate mother liquor are predetermined by actually

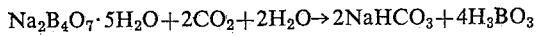

making the saturated solution at the selected $CO_2$ pressure and chemically analyzing for $Na_2O$, $B_2O_3$ and $CO_2$.

TABLE II

The following formulae were derived for a $CO_2$ pressure of 615 p.s.i.a. and they can be used to determine the $Na_2O$, $B_2O_3$ and $H_2O$ content of a sodium bicarbonate mother liquor as a function of the $t_1$ given above:

$$h = -0.96 + 0.032 t_2 + 0.00149 t_2^2$$
$$e = -23.76 + 1.106 t_2 - 0.00647 t_2^2$$
$$f = 116.76 - 0.933 t_2 + 0.00269 t_2^2$$

where:

$h$ = weight percent $Na_2O$
$e$ = weight percent $B_2O_3$
$f$ = weight percent $H_2O$ $$t_2 = t_1 + \frac{710}{t_1 + 20}$$

assuming the stoichiometric water required is added equally to the two mother liquors. If not added equally to each, $t_2$ is determined as explained above.

At a $CO_2$ pressure of 615 p.s.i.a. the need for evaporation of water in this cyclic process can be eliminated if the temperature of the sodium bicarbonate mother liquor $t_2$ is determined as shown above.

It is of the utmost importance to note that in order to carry out the present process it is necessary to preselect a temperature $t_1$ from the range of between 25° C. and 75° C. and a pressure $p_2$ greater than the value of $p$ in the equation $$\log p = 9.06 - \frac{2260}{273 + t_2}$$

make a decision as to the place in the process where the stoichiometrically required water will be added, and determine $t_2$ as previously explained. Values for $g$, $b$, $c$, $e$, and $h$ are then determined as described above, and it is then possible to proceed with the process.

Assuming the process is to be started by adding sodium tetraborate to a boric acid mother liquor, the starting solution is prepared from a mixture of the $Na_2O$, $B_2O_3$ and $H_2O$ components according to the formulae of Table I, heating to the preselected temperature $t_1$ and applying $CO_2$ pressure to the solution according to the formula $$\log p_1 = 9.06 - \frac{2260}{273 + t_1}$$

$p_1$ = p.s.i.a. of $CO_2$ to be applied to the solution
$t_1$ = preselected temperature.

A calculated amount of sodium tetraborate is added to the solution according to the formula $$B = 2.09 \left( \frac{ge}{h} - b \right)$$

where:

$B$ = weight of sodium tetraborate (calculated as $Na_2B_4O_7 \cdot 5H_2O$)

added per 100 pounds of starting solution, $g$ and $h$ are determined from Table I at $t_1$, and $b$ and $e$ are determined at $t_2$ from Table II if $p_2$ is 615 p.s.i.a. or determined by the above previously given procedure if $p_2$ is not 615 p.s.i.a.

If $p_2$ is 615 p.s.i.a., and if the stoichiometric amount of water required is added equally to the two mother liquors, the solution to which the calculated sodium borate has been added is heated to a temperature according to the formula $$t_2 = t_1 + \frac{710}{t_1 + 20}$$

where:

$t_2$ = temperature to which solution is to be heated so that no evaporation of water will be necessary in this cyclic process.

$t_1$ = preselected temperature.

If $p_2$ is not 615 p.s.i.a., or if the water required is not added equally to the two mother liquors, $t_2$ is determined as previously described.

With the change in temperature the $CO_2$ pressure is increased to the preselected value of $p_2$.

At this point sodium bicarbonate crystallizes out and is removed from the solution. The temperature and $CO_2$ pressure are now lowered substantially to the $t_1$ and $p_1$ temperature and pressure. Boric acid now crystallizes and is removed from the solution.

To repeat the cycle sodium borate is again added and the temperatures and pressures adjusted as before.

The stoichiometric amount of water required may be added to either mother liquor or to both. The place of addition of this water will make a slight difference in the value of $t_2$ determined as previously mentioned.

Assume now the process is to be started by crystallizing sodium bicarbonate from a boric acid mother liquor, the starting solution is again produced by preparing a mixture of the $Na_2O$, $B_2O_3$ and $H_2O$ components according to the formulae of Table I, at the preselected temperature $t_1$ and applying carbon dioxide according to the formula:

$$\log p_1 = 9.06 - \frac{2260}{273 + t_1}$$

where:

$p_1$ = p.s.i.a. of $CO_2$ to be applied to the solution

As previously explained, it is necessary to preselect temperature $t_1$ from the range of between 25°–75° C. If $p_2$ is 615 p.s.i.a. and if the stoichiometric water is to be added equally to the two mother liquors, the temperature at which the prepared solution is heated is determined according to the equation:

$$t_2 = t_1 + \frac{350}{t_1}$$

where:

$t_2$ = temperature to which solution is to be heated so that no evaporation of water will be necessary in the process.
$t_1$ = preselected temperature.

Under other conditions, $t_2$ is determined as previously explained.

$CO_2$ is applied to the solution at the preselected pressure $p_2$ at temperature $t_2$. At this point sodium bicarbonate crystallizes out and is removed from the solution. An amount of sodium borate which contains "B" parts $Na_2O$ is added to the mother liquor where:

$$B = g - \frac{bh}{e}$$

and $g$, $b$, $h$ and $e$ have been determined as previously discussed.

The temperature is lowered substantially to the preselected temperature $t_1$ and the $CO_2$ pressure lowered according to the formula $$\log p_1 = 9.06 - \frac{2260}{273 + t_1}$$

With the change in temperature and pressure, boric acid is crystallized which is removed from the solution. The cycle can again be repeated as before.

It is important to note that the temperatures of the foregoing formulae provide mother liquor concentrations at which a cyclic process can be carried out which does not require the evaporation of water.

The invention will be understood in more detail from the examples which follow. The following formulations are given only in the way of example and are in no way presented to indicate that the formulations of compositions of this invention are limited to the cited examples:

EXAMPLE I

Boric acid was produced in a cyclic process in which borax pentahydrate was added to the boric acid mother liquor. The temperature 32° C. was preselected as the temperature to which the boric acid mother liquor was heated.

Using the foregoing formulae a boric acid mother liquor was made which contained 3.74 lbs. $Na_2O$, 11.8 lbs. $B_2O_3$, and 82.2 lbs. $H_2O$. This solution was heated to the preselected temperature 32° C. and $CO_2$ was put into the solution at a pressure of 48 p.s.i.a. 4.18 lbs. of borax pentahydrate ($Na_4B_2O_7 \cdot 5H_2O$) were added to the solution.

The temperature of the solution was raised to 45.7° C., this being the temperature, obtained from the foregoing formula, at which evaporation of water in a cyclic process is not required. $CO_2$ was applied to the solution at 615 p.s.i.a. At this point sodium bicarbonate crystallized from the solution and was removed by filtration. The crystals were washed with 0.26 lb. of $H_2O$ and the washings added to the filtrate.

The filtrate was cooled to 32° C. and the $CO_2$ pressure was lowered to 48 p.s.i.a. At this point boric acid crystallized out of solution and was removed by filtration. The crystals were washed with 0.26 lb. of $H_2O$ and the washings added to the filtrate.

4.1 lbs. borax pentahydrate were added to this filtrate and the cycle repeated.

The process yielded 3.55 lbs. of boric acid/100 lbs. of boric acid mother liquor per cycle.

EXAMPLE II

The $Na_2O$, $B_2O_3$ and $H_2O$ content of a boric acid mother liquor were determined according to the formulae of Table I at a preselected temperature of 26° C. The solution contained 3.0 lbs. of $Na_2O$, 9.75 lbs. of $B_2O_3$ and 85.2 lbs. of $H_3O$.

This solution was heated to 26° C. and 1.94 lbs. of borax pentahydrate ($Na_4B_2O_7 \cdot 5H_2O$) was added and 32 p.s.i.a. of $CO_2$ applied to the solution.

The temperature was raised to 35° C. and $CO_2$ applied at 215 p.s.i.a. Sodium bicarbonate crystallized from the solution, the crystals were washed with 0.12 lb. of $H_2O$ and the washings added to the filtrate.

The filtrate was cooled to about 26° C. and the $CO_2$ pressure lowered to about 32 p.s.i.a. The crystallized boric acid was removed from the solution and the crystals washed with about 0.12 lb. of $H_2O$. The washings were added to the filtrate and the filtrate was then recycled.

The yield was 1.65 lbs. of boric acid/100 lbs. of boric acid mother liquor per cycle.

EXAMPLE III

In this example sodium tetraborate was added to a sodium bicarbonate mother liquor. Using the formulae of Table I a solution containing 4.16 lbs. $Na_2O$ 13.0 lbs. $B_2O_3$ and 80.3 lbs. of water was made at a preselected temperature of 35° C. and a $CO_2$ pressure of 55 p.s.i.a. The temperature was raised to 45° C. and at this temperature 0.19 lb. of water was added and the $CO_2$ pressure increased to 615 p.s.i.a. Sodium bicarbonate crystallized at this point and was removed by filtration. The crystals were washed with 0.19 lb. of water and the washings added to the filtrate. 3.1 lbs. of $Na_2B_4O_7 \cdot 5H_2O$ was added to the mother liquor, which was cooled to 35° C. At this temperature the $CO_2$ pressure was lowered to p.s.i.a. Boric acid crystallized and was removed by filtration. The crystals were washed with 0.19 lb. of water and the washings added to the filtrate. The mother liquor was then heated to 45° C. and the cycle repeated.

The yield was 2.63 lbs. of boric acid/100 lbs. of boric acid mother liquor per cycle.

EXAMPLE IV

Example III was repeated except that 6.29 lbs. of sodium pentaborate was added to the sodium bicarbonate mother liquor.

The yield was 6.59 lbs. of boric acid/100 lbs. of boric acid mother liquor per cycle.

It will be noted from the foregoing discussion that the present invention could be used as a batch process or as a cyclic method for producing boric acid. However, it becomes quite obvious that from an economical standpoint the present invention becomes most valuable when operated as a recycling operation.

Other modes of applying the principle of the invention may be employed, change being made as regards the details described, provided the features stated in the following claim or the equivalent of such be employed.

I, therefore, particularly point out and distinctly claim as my invention:

The cyclic method of producing boric acid from a sodium borate and carbon dioxide in aqueous solution which comprises making a solution containing about 3.74 parts by weight of $Na_2O$, 11.8 parts by weight of $B_2O_3$, and 82.2 parts by weight of $H_2O$; heating said solution to about 32° C. and applying $CO_2$ at a pressure of about 48 p.s.i.a.; adding to said $CO_2$ pressurized solution about 0.89 part by weight of $Na_2O$, 2.0 parts by weight of $B_2O_3$, and about 1.29 parts by weight of $H_2O$; raising the temperature of said solution to about 45.7° C. and applying $CO_2$ at about 600 p.s.i.a.; removing crystallized $NaHCO_3$ from the solution, washing said crystals with about 0.26 part by weight of $H_2O$ and adding said washings to said solution; cooling said solution to about 32° C. and lowering said $CO_2$ pressure to about 48 p.s.i.a.; removing crystallized $H_3BO_3$ from the solution; washing said $H_3BO_3$ with about 0.26 part by weight of $H_2O$, adding said washings to the solution, adding about 0.89 part by weight of $Na_2O$, 2.0 parts by weight of $B_2O_3$ and about 1.29 parts by weight of $H_2O$ and repeating the cycle.

References Cited in the file of this patent

UNITED STATES PATENTS

| | | |
|---|---|---|
| 725,786 | Smethurst | Apr. 21, 1903 |
| 1,108,129 | Burger | Aug. 25, 1914 |
| 2,105,109 | Dolley | Jan. 11, 1938 |
| 2,833,623 | May et al. | May 6, 1958 |

OTHER REFERENCES

Winkler et al.: "J. Am. Chem. Soc." vol. 29, pages 1366 to 1371 (1907).

Thorpe: "Dictionary of Applied Chemistry," Longmans, Green & Co., New York, page 500, 1916, vol. I.

UNITED STATES PATENT OFFICE
CERTIFICATE OF CORRECTION

Patent No. 3,031,264                      April 24, 1962

Nelson P. Nies

It is hereby certified that error appears in the above numbered patent requiring correction and that the said Letters Patent should read as corrected below.

Column 2, line 25, for "hte" read -- the --; column 5, lines 47 and 48, after the formula insert -- where: --; column 7, line 38, for "$H_3O$" read -- $H_2O$ --.

Signed and sealed this 11th day of September 1962.

(SEAL)
Attest:

ERNEST W. SWIDER
Attesting Officer

DAVID L. LADD
Commissioner of Patents